United States Patent

Igarashi et al.

[15] 3,660,736
[45] May 2, 1972

[54] PROCESS FOR THE PRODUCTION OF HIGH-EFFICIENT ELECTRETS

[72] Inventors: Yuriko Igarashi; Haruko Kakutani, both of Tokyo, Japan

[73] Assignee: Kureha Kagaku Kogyo Kabushiki Kaisha, Chuo-ku, Tokyo, Japan

[22] Filed: Mar. 10, 1971

[21] Appl. No.: 122,870

[30] Foreign Application Priority Data

Mar. 10, 1970 Japan....................................45/19723

[52] U.S. Cl. .......................................317/262 F, 307/88 ET
[51] Int. Cl. ...........................................................H01g 7/02
[58] Field of Search...........................317/262 R, 262 F, 258; 307/88 ET

[56] References Cited

UNITED STATES PATENTS 2,538,554  1/1951  Cherry................................317/262 F

OTHER PUBLICATIONS

" Electrets, Semipermanently charged Capacitors" J. Roos Journal of Applied Physics, Vol. 40 No. 8 pp. 3135– 3139
" Electrets," Andrew Gemant Physics Today Vol. 2 No. 3 pp. 8– 13, March 1949
" Electrets" by Thomas A. Dickinson– Plastic Research Co. June 1949

Primary Examiner—J. D. Miller
Assistant Examiner—Harry E. Moose, Jr.
Attorney—Sughrue, Rothwell, Mion, Zinn & Macpeak

[57] ABSTRACT

By heat-treating a polymer-type electret that has been subjected to a polarization treatment at temperatures lower than the melting point of the polymer but higher than the glass transition point of the polymer, an unstable hetero-charge component and the homo-charge component can be reduced and a stable hetero-charge can be sustained.

5 Claims, 1 Drawing Figure

Patented May 2, 1972 3,660,736
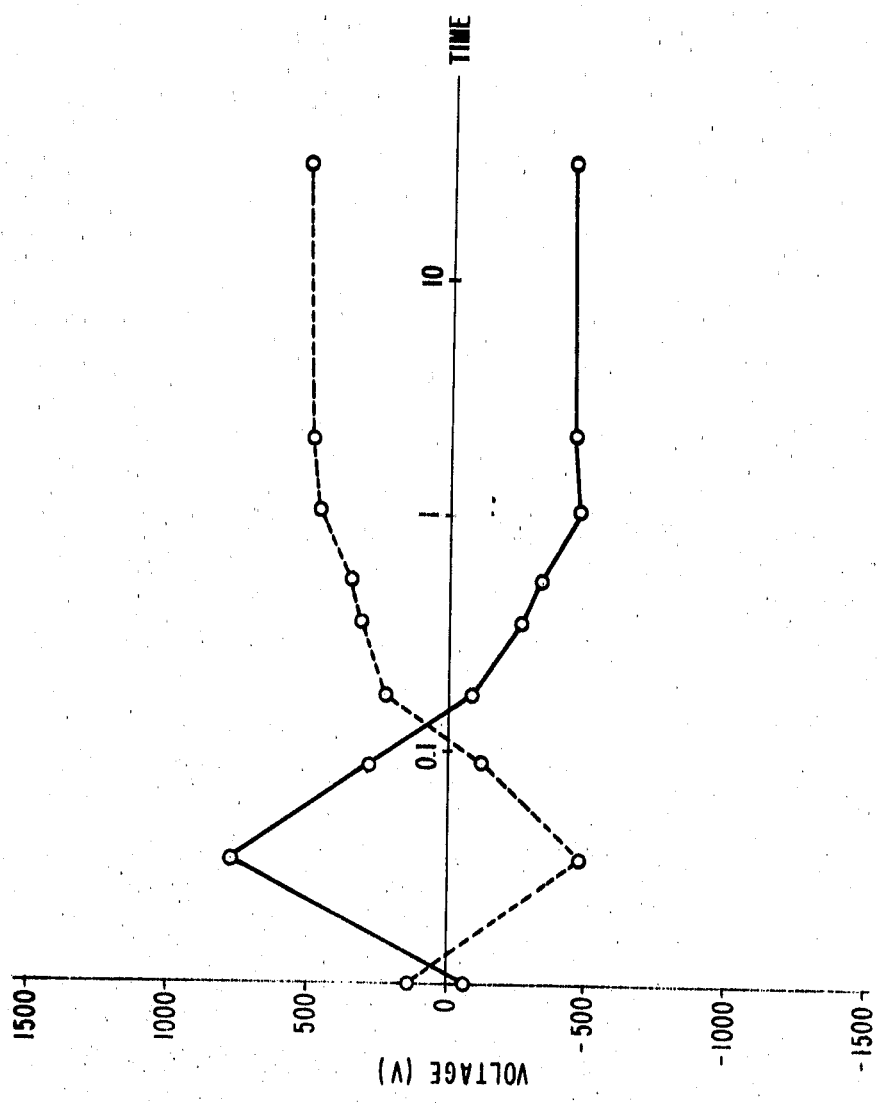
INVENTOR
YURIKO IGARASHI
HARUKO KAKUTANI
BY Sughrue, Rothwell, Mion, Zinn & Macpeak
ATTORNEYS

PROCESS FOR THE PRODUCTION OF HIGH-EFFICIENT ELECTRETS

BACKGROUND OF THE INVENTION

1. Field of the Invention

The present invention relates to a process for the production of a stable electret having excellent properties from a crystalline high molecular weight compound or polymer.

2. Description of the Prior Art

In general, an electret is produced by maintaining a film or a sheet of a plastic; such as a low molecular weight organic material, e.g., carnauba wax or naphthalene; an amorphous high molecular weight material, e.g., polymethyl methacrylate or polyethylene; a crystalline high molecular weight material, e.g., polyethylene terephthalate, polycarbonate, or polyfluoroethylene; or a copolymer or a mixture thereof, at a proper temperature for a long period of time while applying thereto a high D.C. electric field and then cooling the film or sheet up to room temperature while continuing the application of the D.C. electric field. The electret prepared by such a manner can maintain its polarized state for a long period of time and may be used in such wide fields as an electric current-sound converter, e.g., a speaker or a microphone and in other electronic equipment.

In particular, because a halogen-containing crystalline high molecular weight compound such as polyvinylidene fluoride, polyvinyl chloride, polyvinylidene chloride, etc.; a crystalline polyester such as polyethylene terephthalate; and a polycarbonate can be readily molded into a film or sheet, and since they neither soften nor deform at the temperature used for the polarization treatment, these materials have been believed to be the most suitable ones for electrets to be used for various purposes.

For producing the electret from such crystalline high molecular weight materials, a method has generally been employed in which the high molecular weight material is placed in a high D.C. electric field of about 1–200 KV./cm. at a suitable temperature of higher than the glass transition point of the material and lower than the melting point thereof for a proper period of time to cause polarization in the material; and after cooling the material to room temperature while continuing the application of the electric field, the application thereof is stopped, whereby the polarization is fixed. In this case, however, a homo-charge having the same polarity as that of the applied electric field and a hetero-charge having a polarity opposite to that of the applied electric field are formed at the same time, and by the conditions of treatment, either one of the charges may become predominant to determine the sign of the charge of the electret observed.

In general, an electret shows a hetero-charge or a comparatively low charge density of the homo-charge immediately after the production thereof but in a short period of time, the hetero-charge decays and the electret begins to show the homo-charge on the whole and becomes stable gradually, whereby the electret shows finally a constant homo-charge. When electrets are practically used, the stabilized homo-charge is frequently utilized.

When the electret, immediately after the polarization treatment, is maintained at temperatures higher than room temperature, the period of time required for converting the polarity is greatly shortened and the state of the high homo-charge is obtained in a short period of time, but the decay of the homo-charge accompanied thereby is accelerated as the temperature becomes higher and finally the charges at the opposite surfaces are lost, whereby the electret loses its function as an electret.

SUMMARY OF THE INVENTION

As mentioned above, the hetero-charge of an electret is generally unstable and the comparatively stable homo-charge has been believed to be the desirable charge for the electret. The inventors have, however, discovered that there are two or more kinds of hetero-charges having different formation and decaying mechanisms, that is, different stabilities and also there is a highly stable hetero-charge.

That is, when an electret prepared by an ordinary method is maintained at a high temperature, the polarity of the charge is converted as mentioned above and the decay of the homo-charge follows, whereby the charges at the opposite surfaces of the electret are lost; but it has been discovered that when the heating is further continued, the polarity of the charge is astonishingly reversed again and a considerably large hetero-charge appears. This fact proves that there is present a far more stable hetero-charge than the homo-charge which has hitherto been considered to be most stable and in fact, the electret showing the hetero-charge prepared according to the present process can maintain its charge for a far longer period of time than the case of an electret showing a homo-charge prepared by ordinary methods.

BRIEF DESCRIPTION OF THE DRAWING

The FIGURE shows the variation in charge with time of an electret produced according to the process of the present invention.

DESCRIPTION OF THE PREFERRED EMBODIMENT

The period of time necessary to obtain the stable hetero-charge depends, of course, upon the temperature employed for the heat-treatment of the electret. The required period of the time becomes shorter as the heat-treatment temperature increases but it is desirable that the temperature of heat-treatment does not exceed that temperature at which the crystalline polymer begins to melt. In general, the temperature the heat-treatment is lower than the melting point of the raw material or the polymer but higher than the glass transition point thereof.

As mentioned above, the present invention provides a process of producing an improved electret which can maintain a charge for a markedly longer period of time and hence the practical value of this invention is quite large. In addition, the hetero-charge in this invention may be caused by an ionic polarization or a dipolar polarization.

The present invention will be illustrated in more detail by reference to the following non-limiting examples.

EXAMPLE 1

A sheet having a thickness of about 1 mm. prepared by molding a mixture of 70 parts by weight of polyvinylidene fluoride and 30 parts by weight of polymethyl methacrylate was subjected to a polarization treatment in an air bath maintained at 120° C. for 1 hour while applying a D.C. current thereto having an electric field of 50 KV./cm., and then the sheet was allowed to cool to room temperature while continuing the application of the electric field. The electret thus obtained was maintained in an air bath maintained at 100° C. and the variation of the charge was measured, the results of which are shown in the accompanying figure. In the figure, the solid line represents the face which contacts the anode while the dotted line indicates that face which contacts the cathode. That is, the initial hetero-charge decayed rapidly and was converted into the comparatively stable homo-charge, but by further continuing the heat treatment, the homo-charge once formed was converted into a hetero-charge again. The hetero-charge thus obtained was very stable and no decay of the hetero-charge was observed at room temperature; and when the electret treated at 100° C. as above for 1 hour was maintained at 80° C., for 1 week, the decay of the charge was scarcely observed.

The decay time constant ($\tau$) of the surface charge (the gradient of the variation of the surface potential with the passage of time) of the homo-charge which is believed to be stable at 100° C. and 130° C. was compared with that of the hetero-charge of the electret prepared by the process of this invention, the results of which are shown in Table 1.

TABLE 1

| Temperature | Homo-charge | Hetero-charge (τ) |
|---|---|---|
| 100°C. | 0.1 hr. | > 285 hrs. |
| 130°C. | 0.03 hr. | 155 hrs. |

EXAMPLE 2

The sheet used in Example 1 was subjected to a polarization treatment under the same conditions as in Example 1 and after polarization, the application of the electric field was immediately stopped without cooling the sheet and after maintaining the sheet at the same temperature for 0.5 hour in that state, the sheet was gradually cooled to room temperature. When the potential of the electret thus obtained was measured by means of a rotary sector-type potentiometer (Rion Electrostatic Field Meter) at a position of 1 cm. apart from the rotary electrode, the electret was observed to have a hetero-charge of 550 volts and the electret showed excellent stability as the electret obtained in Example 1.

What is claimed is:

1. A process for the production of a highly efficient electret which comprises heat-treating an electret having a hetero-charge and a homo-charge, formed by subjecting a crystalline high molecular weight material to a polarization treatment, at a temperature lower than the melting point of the high molecular weight material and higher than the glass transition point of said material for a sufficient period of time to decay the unstable hetero-charge component and the homo-charge and form a stable hetero-charge.

2. The process as claimed in claim 1 wherein said crystalline high molecular weight material is selected from the group consisting of polyvinylidene fluoride, polyvinylidene chloride, polyvinyl chloride, polyethylene terephthalate, and polycarbonate.

3. The process as claimed in claim 1 wherein said high molecular weight material is a mixture of polyvinylidene fluoride and polymethyl methacrylate.

4. The process of claim 1 wherein said electret is formed by subjecting a crystalline high molecular weight material to a direct current field of from 1 to 200 KV./cm.

5. The process of claim 1 wherein said period of time varies from 0.5 hour to 1 week.

* * * * *